Oct. 18, 1966  E. G. HUBBARD  3,279,861
MEANS AND METHOD OF MAINTAINING A FULL PNEUMATIC
CONVEYING SYSTEM RECEIVER
Filed May 6, 1964
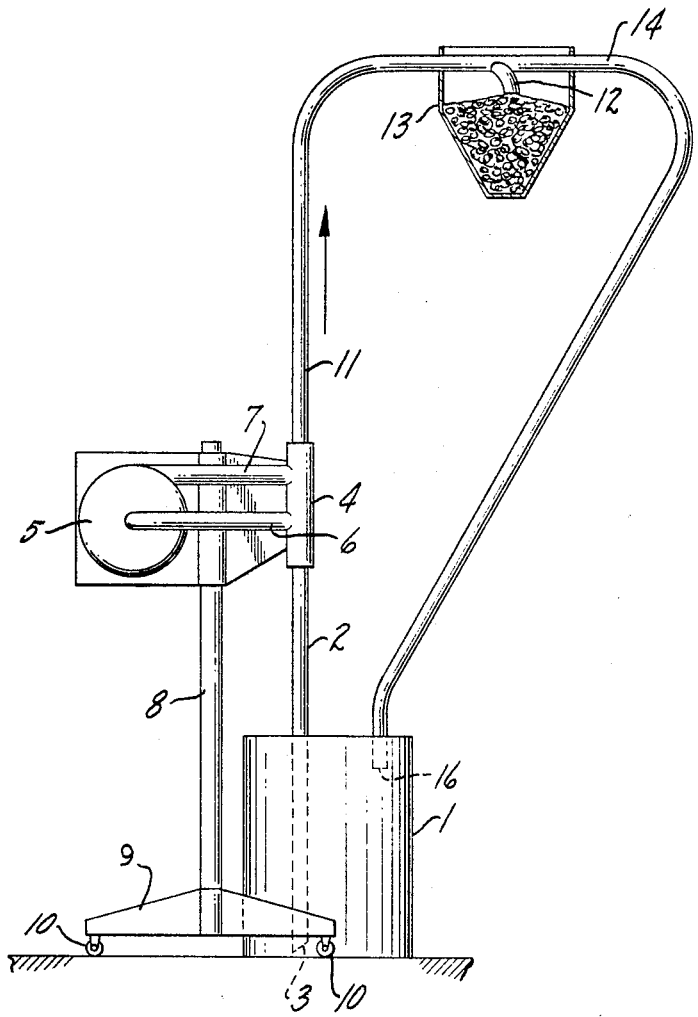
INVENTOR.
Elbert G. Hubbard,
BY Parker & Carter
Attorneys.

United States Patent Office 3,279,861
Patented Oct. 18, 1966

3,279,861
MEANS AND METHOD OF MAINTAINING A FULL
PNEUMATIC CONVEYING SYSTEM RECEIVER
Elbert G. Hubbard, Maywood, Ill., assignor, by mesne
assignments, to Goodman Manufacturing Company,
Chicago, Ill., a corporation of Illinois
Filed May 6, 1964, Ser. No. 365,449
2 Claims. (Cl. 302—17)

This invention relates to the field of pneumatic conveying and has particular relation to a means and method of maintaining a receiver at a predetermined fill level.

Another purpose is to provide a means for continuously operating a pneumatic conveying system while maintaining a receiving hopper at a predetermined fill level.

Another purpose is to provide a means for pneumatically conveying material from a supply, and continuously maintaining a receiving hopper at a predetermined fill level while returning excess material to said supply.

Another purpose is to provide a means and method whereby the material being conveyed is employed as a control mechanism effective to maintain a receiving container at a predetermined fill level.

Another purpose is to provide a pneumatic conveying system having an outlet and means for employing the conveyed material as a shut-off valve for said outlet.

Other purposes will appear from time to time during the course of the specification and claims.

The invention is illustrated more or less diagrammatically in the accompanying drawing, wherein:

The figure is a side elevation.

Like parts are indicated by like numerals throughout the specification and drawing.

Referring now to the drawing, the numeral 1 designates generally a supply of materials to be conveyed. While the supply 1 is illustrated diagrammatically as a bin or container, it will be understood that the supply 1 may take a variety of forms, including containers of various shapes, mechanical and other conveyor mechanisms, and the like. Similarly, the supply 1 may be filled or supplied, from time to time, by any suitable mechanism (not shown) without departing from the nature and scope of the invention. The means or method of providing the supply of material to be conveyed forms no part of the present invention, it being sufficient that a supply 1 be presented for conveying.

The materials at supply 1 are drawn into a vacuum conduit 2 which, as illustrated, may have its inlet end 3, as shown in dotted lines, positioned adjacent a lower portion of the supply 1. Similarly, it will be understood that the supply 1 may feed materials to the inlet 3 from a suitable scoop or plate adjacent an outlet at the bottom of a container such as that illustrated diagrammatically at 1. Materials being conveyed move through a vacuum-pressure exchanger member 4. A vacuum-pressure generator 5 communicates with exchanger 4 through conduits 6 and 7, the generator 5 and conduits 6 and 7 being supported on a suitable support 8. The support 8 may be carried on a portable base 9, in turn supported on rollers 10.

From the exchanger 4, the materials to be conveyed are delivered to a pressure conduit 11. The pressure conduit 11 discharges through an outlet 12 positioned within a receiver 13 which may conveniently take the form of the hopper shown. It will be understood that the materials delivered to receiver hopper 13 are discharged therefrom by any suitable mechanism (not shown) at the will of the operator.

The conduit 11 has a continuing portion 14 beyond the outlet 12. The conduit 14 extends, in a return path, to the supply 1 and discharges at its outlet 16 into the supply 1.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. The scope of the invention should, therefore, be limited only by the scope of the hereinafter appended claims.

For example, the invention has been found particularly useful in conveying materials upwardly for downward delivery into a hopper as shown, but the invention may be useful in a variety of conveying systems of varying configurations. Similarly, it will be understood that the particular structural details of the conveying mechanism may vary without departing from the nature and scope of the invention, it being sufficient that materials be delivered by pneumatic conveying means to outlet 12.

The use and operation of the invention are as follows:

The means and method of the invention are effective to maintain a predetermined fill level in a receiver and to preclude stop-and-start operation of the conveying mechanism.

Materials are presented from the supply 1 to the inlet 3 of the conveying system. The materials to be conveyed are thence drawn into the vacuum conduit 2 and into exchanger 4 from whence they are conveyed by pressure forces through conduit 11. It will be understood that the generator 5 is operated in accordance with the variable factors of the distance and direction of conveyance, the nature, size and weight of the materials to be conveyed, the inner diameter of conduits 2 and 11, and the rate at which materials are to be conveyed, the generator 5 being operated to deliver the materials to outlet 12 at a velocity such that the materials will flow outwardly from the outlet 12 into hopper 13 at a velocity and force somewhat less than that present, for example, at the outlet of exchanger 4. Thus the materials are moving at a relatively slow rate and are subject to gravitational pull. The conduit 11 is curved just prior or adjacent to outlet 12 and the materials and air flow will tend to follow the curve, i.e. to follow the path of least resistance, the outlet 12 opening to atmosphere.

As the materials build up in hopper 13, they approach the outlet 12 positioned therein. When sufficient materials have been delivered to hopper 13 to cause the surface of said materials to contact and block the outlet 12, as shown in the drawing, the materials following in conduit 11 will follow with the air stream therein into conduit portion 14 and be returned to supply 1. As materials are discharged from hopper 13 and the upper surface thereof falls away from the outlet 12, the outlet 12 will again be exposed and materials will then again flow, and continue to flow, from conduit 11 through outlet 12 into hopper 13 until the level of materials therein again closes it at the outlet 12 and additional materials following in conduit 11 will be returned by conduit 14 to supply 1.

Thus the conveying mechanism 2, 4, 5, 6, 7 and 11 may be continuously operated and the operator is assured of maintaining the hopper 13 at a predetermined level without overfilling hopper 13 and the hopper 13 may be maintained at a predetermined fill level set by the position of outlet 12 within hopper 13.

There is claimed:

1. Means for conveying materials including a first conduit portion having an inlet, supply means for supplying to said inlet materials to be conveyed, a second conduit portion, means communicating with said first and second conduit portions and effective to create a conveying air stream in said first and second conduit portions, said second conduit portion having an outlet, a receiving hopper adjacent said outlet, a third conduit portion communicating with said second conduit portion adjacent said outlet, said third conduit portion having an outlet positioned to discharge materials to said supply means, said second conduit portion outlet being positioned with relation to said hopper at a predetermined fill level therein whereby materials delivered to said hopper will close said second conduit portion outlet when said materials reach said predetermined fill level.

2. Means for conveying materials including a vacuum conduit, supply means for supplying to said vacuum conduit material to be conveyed, a pressure conduit, vacuum-pressure generating means communicating with said vacuum and pressure conduits, a return conduit communicating with said pressure conduit, an outlet for said pressure conduit, a receiving hopper having a predetermined fill level, said pressure conduit outlet being positioned with relation to said reeciving hopper at said fill level, said return conduit having an outlet positioned to discharge material to said supply means.

References Cited by the Examiner
UNITED STATES PATENTS

| | | | |
|---|---|---|---|
| 2,509,984 | 5/1950 | Morrow | 302—52 |
| 2,668,649 | 2/1954 | Clark | 302—43 |
| 2,743,965 | 5/1956 | Mattson | 302—59 |

FOREIGN PATENTS

| | | |
|---|---|---|
| 1,099,520 | 3/1955 | France. |
| 129,127 | 9/1959 | Russia. |

EVON C. BLUNK, *Primary Examiner.*

ANDRES H. NIELSEN, *Examiner.*